Patented Oct. 23, 1951

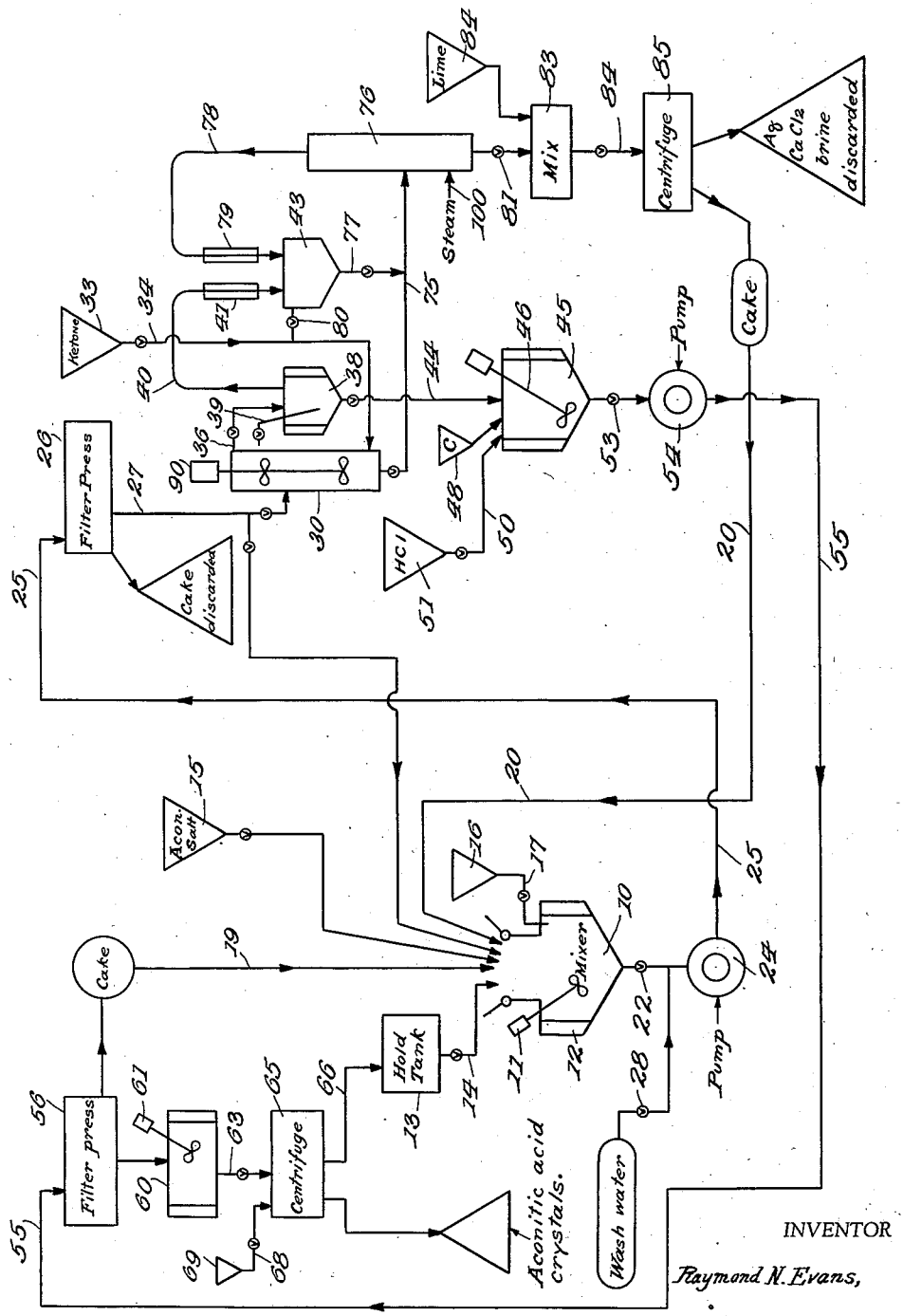

2,572,018

UNITED STATES PATENT OFFICE 2,572,018

RECOVERY OF ACONITIC ACID FROM ACONITATE SALT

Raymond N. Evans, Reserve, La., assignor to Godchaux Sugars, Inc., New Orleans, La., a corporation of New York Application August 31, 1950, Serial No. 182,588

8 Claims. (Cl. 260—537)

This invention concerns the preparation of aconitic acid from aconitate salts.

A feature of the invention is the separation of aconitic acid from an aqueous liquor by employment of a preferential solvent of the aconitic acid which at one stage picks up a large quantity of the aconitic acid and at another stage is itself eliminated from a residual solution of aconitic acid; wherewith said preferential solvent has a relatively low inter-solubility or miscibility with water and aqueous solutions so that layer formation may be provoked under the condition where the preferential solvent accepts the larger quantity of aconitic acid.

Another feature of the invention is the employment of a cyclic procedure of converting a water-insoluble aconitate salt to aconitic acid and recovering the said aconitic acid through employment of a preferential solvent of relatively low miscibility with water and aqueous solutions; including the removal of the selective solvent and treatment of residual water solution with acid prior to the recovery of aconitic acid by crystallization therefrom, together with the return of the acid mother liquor for treatment of an additional quantity of aconitate salt.

Another feature of the invention is the provision of a process for treating a water-insoluble aconitate salt with a mineral acid to effect conversion to aconitic acid dissolved in a salt liquor, subjecting the acid liquor to extraction with a preferential solvent of the group consisting of methyl ethyl ketone, tetrahydrofuran and tetrahydropyran, for obtaining an organic solvent layer and a watery layer; removing the organic solvent from the upper layer, acidifying the remainder of the upper layer, filtering and cooling the filtrate for effecting crystallization of aconitic acid therefrom; employing the acid mother liquor from the crystallization for treatment of additional calcium aconitate; removing the organic solvent from the aforesaid watery layer, liming the watery layer and separating into liquid and solid components; and returning the aforesaid solid component for re-treatment in the presence of the acid mother liquor.

It has been found that among the many solvents for aconitic acid, which might suggest themselves to an expert in the art, practically all fail when subjected to actual practical employment in this process, and in fact there appears a specific corollation of chemical and physical properties in methyl ethyl ketone, tetrahydrofuran and tetrahydropyran which fit them for service here, although upon inspection other substances would appear more favorable for the treatment. Among the difficulties, not ascertainable simply from published tabulations of values, which have been encountered with use of apparently equivalent materials has been behavior by which the intended preferential solvent accepts such a great quantity of the water solute (such as calcium chloride) that the ash content is too high to permit a commercial recovery of an essentially pure aconitic acid by simple crystallization. Other apparently equivalent organic solvents demonstrate an excessive inter-solubility or miscibility with water, so that no stratification occurs or after stratification the organic layer contains too much water (possibly with its ash content) while the watery layer contains too much organic solvent (with its content of aconitic acid). Other organic solvents may react with one or another component of the system, or molecularly condense or polymerize of themselves, so that impurities thus appear in the aconitic acid product, together with an uneconomical loss of the organic solvent. Other organic solvents satisfactorily take up aconitic acid from a watery solution, but economical separation of the aconitic acid from the solvent, or of the solvent from the aconitic acid, has not been accomplished; yet other solvents exhibit toxic effects which require special precautions and skill in operation. It has been found striking that the stated materials produce successful results, in distinction from the lack of success with other materials having apparently similar chemical and physical properties as reported by the literature.

With the above-stated features as objects in view, an illustrative practice of the invention will now be described.

The attached drawing illustrates by a conventionalized apparatus assembly the introduction, movement, reaction, separation and recovery of the materials employed and obtained.

Since the procedure comprises the recycling and capture of values, the primary description will be addressed to the introduction of original aconitate salt and the separation of aconitic acid crystals; together with a description of the several recoveries of further values.

500 grams of calcium magnesium aconitate (containing 232.5 grams aconitic acid) are introduced e. g. by the hopper 15 into the treating vessel 10 which has an agitator 11 and a jacket 12 for receiving steam whereby to hold the contents of vessel 10 at a temperature of 140° to 160° F.

There is also introduced, to treating vessel 10, a solution of hydrochloric acid in an amount equivalent to the aconitic acid in the aconitate plus an excess of 5%: as described hereafter, this may be in whole or part the acidified recycling mother liquor of a previous run and coming from a holding tank 13 through a valved conduit 14. In addition, 20 grams of 31% hydrochloric acid may be introduced from a holding tank 16 through a valved conduit 17 to the treating vessel 10, to make make up for any manipulative loss, which in an illustrative batch process arose during suction filtering operations: that is, in a theoretical, loss-free system, no addition from tank 16 is necessary, and the actual quantity for each batch can be determined by analysis of the mother liquor in tank 13, to assure the 5% excess. There may also be introduced into the treating vessel 10 the filter cake from a prior run, as indicated by the flow lines 19 and 20, to which further reference will be made hereafter.

Reaction proceeds in the treating vessel 10, with operation of the agitator 11 for fifteen minutes at the stated temperature of 140° to 160° F. Thereupon the discharge valve 22 is opened and the contents of the treating vessel 10 are withdrawn by the pump 24 and delivered through conduit 25 into a filter press 26 which is also held at 140° to 160° F. The liquid separated in the filter press is passed by conduit 27 into the extraction tower 30. After the contents of the treating vessel 10 have been withdrawn, the valve 22 is closed, and a quantity of wash water is admitted by opening the valve 28, whereupon the pump 24 employs this water for clearing the conduit 25 and washing the cake in the press 26, delivering the liquid by conduit 27 to the extraction vessel 30 or to the treating vessel 10, depending upon the concentration. The cake from filter press 26 may be discarded: with the specified quantities, it contained 2 grams of aconitic acid, which is less than 1% of the starting aconitate; largely as unreacted aconitate, along with melassigenic solids which were not washed out during the prior treatment steps.

The liquid entering the extraction vessel 30 is composed chiefly of water, aconitic acid, calcium chloride and hydrochloric acid. Methyl ethyl ketone may be introduced from the supply vessel 33 through the valved conduit 34 at a low point in the extraction vessel 30, wherewith it can move upwardly in the vessel 30 in counter-current to the liquor from conduit 27, in either a batch or continuous operation. The quantity of methyl ethyl ketone introduced should be such as to maintain a weight ratio of approximately 5:4 of ketone layer: water layer, and it has been found that at such a ratio in a batch operation, stratification occurs rapidly. A larger ratio increases the over-all yield of extracted aconitic acid, but the quantity of solvent to be evaporated for re-use also increases: by cyclic operation as described herein, the values are essentially recovered without demanding the cost and expense of the heat for such evaporation. When the ratio is reduced below this value of 5:4 or 1.25, the extraction yield is decreased. In the numerical example here given, the separation by a batch operation in extraction vessel 30 gave 3190 grams of a supernatant ketone layer and 2430 grams of an underlying water layer; after the operation of stirring by agitator 90 followed by settling for fifteen minutes.

The upper ketone layer of a batch operation, or the upper contents of the extraction vessel 30 when operated as a continuous counter-current operation, are drawn off at about room temperature through the valved conduit 36 to the evaporator 38 which has a steam jacket. For the numerical example, it was found that the ketone solution fed to the evaporator 38 contained approximately 10% of aconitic acid, 8% of water and 0.02% of ash (calcium chloride). The methyl ethyl ketone forms an azeotrope containing 11% by weight of water and boiling at 73° C. or 163° F. Steam can be introduced to the jacket of the evaporator 38 and also through the valved sparging pipe 39, and the final weight ratio of water: aconitic acid is brought to and held between 2:1 and 1½:1. Under these conditions, all of the ketone is expelled from the evaporator 38 through the vapor discharge conduit 40 having a condenser 41, into a separator-receiver 43, which it at near room temperature, depending upon the efficiency of the condenser action with water (normally 85° F.). Two layers may appear in the separator-receiver 43, because water and ketone are not completely miscible at the prevailing temperature and concentration. Water dissolves in methyl ethyl ketone to the extent of 12.5% by weight at 20° C. (68° F.); and the ketone dissolves in the water to the extent of 27% by weight.

The water solution from evaporator 38, at its temperature of about 190° F. and with its contents of aconitic acid, is withdrawn through the valved conduit 44 to the carbon treatment tank 45 which also is maintained at about 190° F. by a steam jacket, and which is provided with a stirrer 46. 10 grams of commercial decolorizing carbon are preferably added from the supply vessel 48: and serves to shorten the purification by later washing of the crystals. 550 grams of 31% commercial hydrochloric acid are introduced through the valved conduit 50 from the acid storage tank 51. After treatment in the tank 45 for about 30 minutes, the bottom discharge valve 53 is opened and the contents of the tank are withdrawn and delivered by a pump 54 through a conduit 55 into a filter press 56. The cake from this press can then be returned, as indicated by the aforesaid flow line 19 into the treating vessel 10 for a subsequent operation: the wet weight of the carbon is about 30 grams, i. e. the cake carries about 70% of mother liquor.

The liquor from the filter press 56, still at a preferred temperature of around 180° to 190° F., is delivered into the crystallizer 60 having a cooling jacket for bringing its contents down to 35° F. A stirrer 61 is provided in the crystallizer 60. This effluent essentially consists of aconitic acid, water, and hydrochloric acid. Crystals of aconitic acid begin to form at 145° F.: at 35° F. there remains in the mother liquor 4 to 5% by weight of aconitic acid. The entire slurry contents of the crystallizer 60 may be passed through the centrifuge 65. The liquor from the centrifuge is delivered by conduit 66 to the holding tank 13. When the centrifuge contains a charge of the aconitic acid crystals, the valve in conduit 63 may be closed, and a washing operation conducted by admitting through the valved conduit 68 a 5% aqueous solution of hydrochloric acid from the supply vessel 69 in which the same has been brought to 35° F. The quantity of wash liquor depends upon the performance of the centrifuge.

In the numerical example, the crystals from the slurry in crystallizer 60 gave 304 grams of white crystals: on drying in a natural convection oven at 150° F. for fifteen hours, the final dry weight was 196 grams. Upon analysis, this product contained 0.03% ash by weight, and analyzed at 99.8% aconitic acid by titration, thus representing an 83% yield based on the starting aconitate for this single cycle of operation.

The acid mother liquor recovered from the crystallizer 60 represents the amount of hydrochloric acid for treating a second identical quantity of 500 grams of calcium magnesium aconitate in the treating vessel 10, when the make-up acid has been added from a supply vessel 16 as stated above. In the numerical example, the mother liquor weighed 1165 grams and contained 60 grams of aconitic acid. It will be noted that in the procedure, the aconitic acid is maintained at a fairly constant quantity in the mother liquor, as the crystallization is occurring under like conditions, and the quantity of acid wash water is essentially standard for each cycle: so that in the repeated cycles, the percentage yield may be closely computed on the basis of the recovered aconitic acid divided by the equivalent aconitic acid in the aconitate salt added for each cycle.

The percentage yield of aconitic acid over repeated cycles is also increased by recovery from the lower water-rich layer, which is delivered from the extracting vessel 30 through the valved conduit 75 into a ketone stripping column 76 at a mid-height thereof, together with the lower water layer (essentially at room temperature) from the separator-receiver 43 as controlled by the valved conduit 77. Steam is introduced into the lower part of the stripping column 76 by conduit 100 and maintains a temperature range in the column of about 70° C. and 102° C., between the boiling point of the azeotrope and that of a water solution containing 10 to 12% of calcium chloride; so that the ketone is evaporated therein and is discharged from the top through the vapor pipe 78 with its condenser 79, for recovery in the separator-receiver 43. During repetitions of the cycle, this ketone recovery is such that by opening the valve 80, this ketone flows by conduit 34 to the extraction column 30 for use therein, and the supply vessel 33 is only employed for making up losses, which may be around 2%.

The ketone stripping column 76 receives heat from steam injected by conduit 100, so that the lower part of the column 76 is a hot aqueous calcium chloride solution containing some aconitic acid and hydrochloric acid. Upon opening the valve 81, this lower layer can be drawn down to a mixing vessel 83 in which it receives about 19 grams of lime (as CaO) from a supply 84 to neutralize it and produce calcium aconitate which has low solubility in the water. The slurry is withdrawn from vessel 83 through the valved conduit 84 to a centrifuge 85. The cake, comprising recovered aconitate (about 12% of weight of the original aconitate), is then returned as indicated by the aforesaid flow line 20 to the treating vessel 10. The effluent liquid from centrifuge 85 is a water solution containing 10 to 12% of calcium chloride which can be discarded.

In lieu of methyl ethyl ketone, tetrahydrofuran or tetrahydropyran may be utilized. These three organic solvents (methyl ethyl ketone, tetrahydrofuran and tetrahydropyran) have been found remarkably specific in removing aconitic acid from an aqueous solution also containing calcium chloride or like salt, this solution in the numerical example above having approximate concentration of 10 to 15% of calcium chloride. Tetrahydrofuran has a boiling point of about 65.4° C. at 760 mm. pressure; a specific gravity at 20° C. of 0.888; freezing point below minus 100° C.: a single batch extraction therewith, following the procedure described above, using calcium magnesium aconitate and hydrochloric acid, gave a yield of 94%. Tetrahydropyran has a boiling point of 88° C. at 760 mm. pressure; a specific gravity at 20° C. of 0.8814: a single batch extraction, as before, gave therewith a yield of 90%. Each of these solvents likewise is resistant to losses by way of polymerization or condensation, so that the solvent may be continued in cyclic operation with addition of minor make-up quantities. Each of the solvents further has the property of holding a large quantity of aconitic acid in solution at the temperatures of treatment.

In the above illustration of practice, essentially on a batch basis, through a single cycle, the yield for the first set of operations or cycle, was stated to be around 83%, with co-recoveries of material for re-introduction by recycling. By repeating the batch-type operations, and by making the procedure essentially continuous, the efficiency is greatly increased. For example, by employing a continuous counter-current flow in the extraction vessel 30, while employing aconitate salt at vessel 10, which (dry basis) had an average analysis of 51.7% of aconitic acid, it was found that the averaged distribution of the aconitic acid in one complete cycle was:

|  | Grams | Percent |
| --- | --- | --- |
| Aconitic Acid in the bag | 475 | 72.8 |
| Filter Cake | 10 | 1.5 |
| CaCl$_2$-Water | 8 | 1.2 |
| Mother Liquor (Recycle) | 142 | 21.6 |
| Loss: 1. Experimental 2. Carbonate 3. Itaconic Acid | 19 | 2.9 |
| Total | 654 | 100 |

For this operation, employing the flow sheet of the accompanying drawing, the relative excess of hydrochloric acid to aconitate in the treating vessel 10 was raised to 20%: the filter cake from filter press 26 was re-slurried at 180° F. in 1.3% hydrochloric acid solution, and refiltered, recovering the liquor and discarding the final cake: the extraction vessel 30 was operated under continuous counter-current conditions, with a filling of glass beads, with rate of flow so adjusted that the interface between the two layers was at the top of the packing. Likewise, the ratio of extract to raffinate was held at 1.6 from the vessel 30, and with an extraction time in the vessel 30 of about two hours: the dosage of carbon from the supply 48 was 6%, by weight of the aconitic acid in the aconitate. With this liquid-liquid extraction in vessel 30, the quantity of aconitic acid carried with the water into conduit 75 and passing into the cake from centrifuge 85 was reduced from the foregoing single-batch example, to around 1.5%. Finally, the aconitic acid crystals in centrifuge 65 were washed with 5% hydrochloric acid, the quantity being 11% by weight of the total mother liquor, or 250 grams of 5% hydrochloric acid for 475 grams of aconitic acid (dry weight). Ketone was introduced to the initial filtrate from the filter press 26, before the cycling was started. Under these conditions, the loss per cycle amounted to about 3% of the aconitate added for each cycle. In practice, under careful controls for a single operation, the final yield of aconitic acid was 92%, with a further 2% obtainable by the following operating cycle. Thus, yields up to 94 and 95% are obtainable. On checking the ketone, after this had passed through fifteen cycles, a sample distilled completely without residue. The crystals of dried aconitic acid, with analysis averaged over the course of several operations, showed an ash content of 0.02%, with a purity of 99% plus, both by titration and by evolution.

The temperature in the treating vessel 10 should be about 140–160° F. The extraction tower 30 can be operated at room temperature. The liquid temperature in the evaporator 38 should be 220° F. maximum: and the temperatures in the carbon treatment tank 45 and the filter press 56 should be 170–190° F. The temperature in the crystallizing vessel 60 has been illustrated as 35° F., as an economical temperature to maintain therein, being closely approximate to the freezing point of water, and being a temperature at which the mother liquor has sufficient mobility to permit the ready formation and separation of the crystals of aconitic acid.

The cyclic operations comprise several interlocking circuits of chemical and physical nature: in each of which circuits materials enter and leave, with the grouping of the circuits permitting the passage of the aconitic radical through a series of operations leading ultimately to a high yield of purified aconitic acid crystals, with associated side-circuits for recovery of aconitic acid values and for re-use of introduced chemicals. Among the cycles for re-use, for example, is that by which the ketone in the extraction vessel 30 moves through the conduit 36 to the evaporator 38, wherein it is expelled from the residual water, through a conduit 40 and condenser 41, being collected in vessel 43 to form an upper ketone layer therein, and then being returned for use in the extraction vessel 30 either as a batch operation, or in counter-current flow. This circuit represents the ketone taking up aconitic acid in the extraction vessel 30, and then being expelled from the ketone-water mixture in evaporator 38, so that the aconitic acid passes to the mixing vessel 45 in solution in residual water. A further ketone side-circuit is that by which ketone dissolved in the water component or layer in the separator 30 moves by conduit 75 to the stripper 76, from which it is evaporated, with the vapor passing by conduit 78 to condenser 79 and thus into the collecting vessel 43 for return to the extraction vessel 30. A further side-circuit for the ketone is that in which the ketone in a lower aqueous layer in vessel 43 likewise moves to the stripper 76, for expulsion of evaporated ketone by conduit 78 as before. Acid is continually being introduced to the system in the treating vessel 45, and ultimately passes with the mother liquor into the treating vessel 10, thus in part paralleling the movement of the main aconitic component but creating an acid phase therein: but then being separated from the major aconitic acid movement during the layer formation with the ketone, and this acid movement terminates after the acid for its major part has passed with the water layer for treatment with lime from the supply 84, so that the material handled in the centrifuge 85 is essentially neutral, and the cake representing aconitate salt recovered from the centrifuge is thus separated from the discharged calcium chloride liquor. The decolorizing carbon brought in from the supply 48 accompanies the acid through the filter press 56, in which it is separated with the cake which is re-introduced to the extraction vessel 10: the carbon then continues by conduit 25 and is ultimately separated at the filter press 26, preferably after the re-slurrying and second filtration as described above. Water enters the system at many points, for washing purposes and as a diluent. In successive batch or in continuous operations, the excess of water is discharged with the waste calcium chloride liquor.

While the operation has been described in conjunction with conventionalized apparatus, it will be understood that the several steps as set out in the following claims may be accomplished by other means.

I claim:

1. The process of preparing aconitic acid, which comprises heating a water-insoluble aconitate in the presence of mineral acid and obtaining an acid aqueous liquor containing aconitic acid; treating said aqueous liquor with a selective organic solvent from the group consisting of methyl ethyl ketone, tetrahydrofuran and tetrahydropyran; separating from the treated liquor an organic solution containing some water and containing aconitic acid, and heating the same to expel the organic solvent and to leave a hot aqueous residual liquor; adding mineral acid to the aqueous residual liquor and separating the product of said acid treatment to obtain a hot liquid component; cooling said liquid component to effect crystallization from an acid mother liquor; and separating crystals of aconitic acid from the said mother liquor.

2. A cyclic process as in claim 1, in which the acid mother liquor is employed in cycle to treat additional water-insoluble aconitate.

3. The process of preparing aconitic acid, which comprises heating calcium magnesium aconitate in the presence of hydrochloric acid and obtaining an acid aqueous liquor containing aconitic acid and calcium chloride; treating said aqueous liquor with methyl ethyl ketone; separating from the treated liquor an organic solution containing some water and containing aconitic acid, and heating the same to expel the said ketone and to leave a hot aqueous residual liquor and separating the product of said acid treatment to obtain a hot liquid component; cooling said liquid component to effect crystallization from an acid mother liquor; and separating crystals of aconitic acid from the said liquid component.

4. A cyclic process as in claim 3, in which the acid mother liquor is employed in cycle to treat additional alkaline earth aconitate.

5. The process of preparing aconitic acid, including the cyclic steps of heating calcium magnesium aconitate with hydrochloric acid to a temperature of 140 to 160° F., and thereafter filtering; treating the filtrate with methyl ethyl ketone and separating a component rich in methyl ethyl ketone with solutes therein from a component rich in water with solutes therein; heating and expelling methyl ethyl ketone from the ketone-rich component, and treating the residual liquor with hydrochloric acid; cooling the acidified liquor and permitting crystallization of aconitic acid therefrom; separating aconitic acid crystals from the acid mother liquor, and returning the acid mother liquor for treatment of additional calcium magnesium aconitate in cycle.

6. The process of preparing aconitic acid, including the cyclic steps of heating calcium magnesium aconitate with hydrochloric acid to a temperature of 140 to 160° F., and thereafter filtering; treating the filtrate with methyl ethyl ketone and separating a component rich in methyl ethyl ketone with solutes therein from a component rich in water with solutes therein; heating and expelling methyl ethyl ketone from the ketone-rich component, and treating the residual liquor with hydrochloric acid; filtering the acid liquor, cooling, and separating crystallized aconitic acid therefrom; heating the water-rich component for stripping the ketone therefrom; mixing the stripped aqueous solution with lime for neutralizing; separating solid and liquid components of the mixed liquor; and returning the solid component in cycle for treatment with acid along with original calcium magnesium aconitate.

7. The process of preparing aconitic acid, which comprises heating water-insoluble alkaline earth aconitate in the presence of hydrochloric acid and obtaining an acid aqueous liquor containing aconitic acid; treating said aqueous liquor with a selective organic solvent from the group consisting of methyl ethyl ketone, tetrahydrofuran and tetrahydropyran; separating from the treated liquor an organic solution containing some water and containing aconitic acid and a water solution containing some organic solvent; and heating the organic solution to expel the organic solvent and leaving a hot aqueous residual liquor; adding hydrochloric acid to the aqueous residual liquor and separating the product of said acid treatment to obtain a hot liquid component; cooling said liquid component to effect crystallization from an acid mother liquor; separating crystals of aconitic acid from the said mother liquor; heating the water solution to expel the organic solvent therefrom, alkalizing with lime to precipitate aconitate salt therefrom, and separating and returning said aconitate salt for treatment with acid in cyclic repetition of the aforesaid initial acid treatment.

8. The process as in claim 7, in which the organic solvent is methyl ethyl ketone, and in which the ketone fractions expelled individually from the separated organic and water solutions are joined and employed in cycle for treating additional acid aqueous liquor from the stated initial step of heating aconitate salt with hydrochloric acid.

RAYMOND N. EVANS.

No references cited.